United States Patent [19]

Stoll et al.

[11] Patent Number: 5,628,392

[45] Date of Patent: May 13, 1997

[54] REVERSIBLE BELT SCRAPER BLADE FOR CLEANING HIGH SPEED CONVEYOR BELTS

[75] Inventors: Lewis D. Stoll, Port Byron, Ill.; Richard D. Stoll, Huntington; Jerry A. Roseberry, Ona, both of W. Va.

[73] Assignee: Richwood Industries, Inc., Huntington, W. Va.

[21] Appl. No.: 422,802

[22] Filed: Apr. 17, 1995

[51] Int. Cl.$^6$ ............................................. B65G 45/00
[52] U.S. Cl. ....................... 198/497; 198/499; 15/256.6
[58] Field of Search .................................. 198/499, 497, 198/493; 15/256.6, 256.51, 256.52, 250.361

[56] References Cited

U.S. PATENT DOCUMENTS

| | | | |
|---|---|---|---|
| 4,257,517 | 3/1981 | MacPherson et al. | 198/497 |
| 4,328,888 | 5/1982 | Luke | 198/499 |
| 4,365,706 | 12/1982 | Bright | 198/499 |
| 4,402,394 | 9/1983 | Stoll | 198/499 |
| 4,696,388 | 9/1987 | Stoll | 198/493 |

FOREIGN PATENT DOCUMENTS

| | | | |
|---|---|---|---|
| 2313449 | 9/1974 | Germany | 198/499 |
| 217419 | 9/1986 | Japan | 198/497 |
| 2205804 | 12/1988 | United Kingdom | 198/499 |

*Primary Examiner*—Frank E. Werner
*Attorney, Agent, or Firm*—Biebel & French

[57] ABSTRACT

A reversible belt scraper is provided with opposite belt scraping surfaces and is adapted to be reversed by inverting. The belt scraper is formed with a pair of metal side frames, and a transversely elongated body is formed as a block of rubber defining the belt scraping surfaces on opposite sides. A pair of fiberboard backing plates are positioned to support the rubber block against forces tending to bend or deflect the rubber. The fiberboard backing plates wear at a rate faster than the wear rate of the rubber block and assure full contact between the belt and the rubber scraping body. In a further embodiment, ceramic bricks are embedded within the rubber block with wear surfaces at the rubber scraping surface. The rubber, brick and backing plates are formed in modular segments which are stacked end-to-end between the frames and retained by metal slugs which extend through the segments.

11 Claims, 4 Drawing Sheets

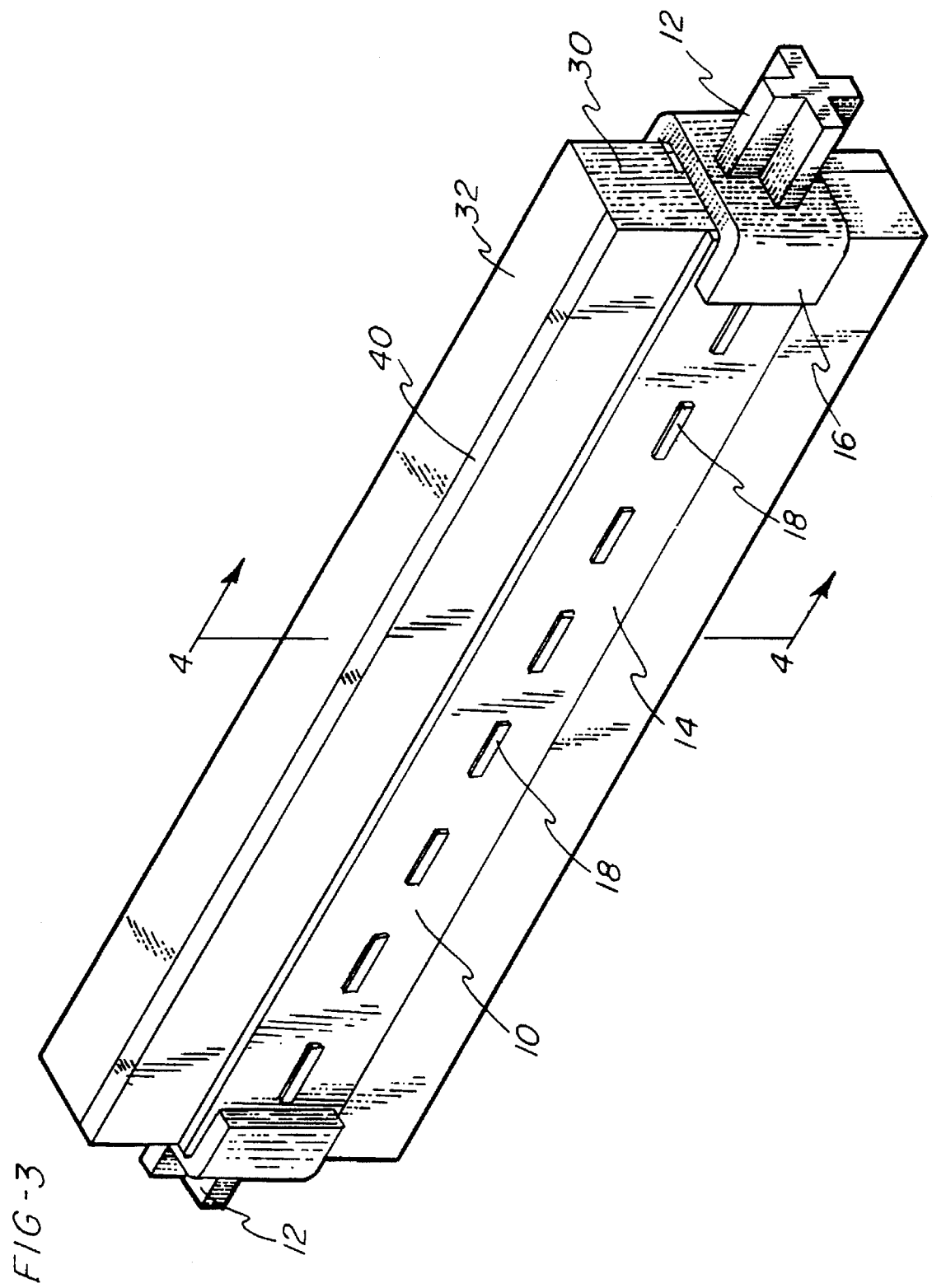

REVERSIBLE BELT SCRAPER BLADE FOR CLEANING HIGH SPEED CONVEYOR BELTS

BACKGROUND OF THE INVENTION

This invention relates to conveyor belt scraper blades, and particularly blades for the scrapping and cleaning of high speed coal conveyor belts. It is particularly directed to a reversible scraper blade.

Through the years, in many industries the demands on belt scrapers remained reasonably modest. As an example, rubber compounds as scrapping elements have proven successful when operated with belt scrapers as used in bulk material conveyor installations in which the conveyor belts are, for the most part, relatively short i.e., under 1,000 ft. long and operate at relatively low speeds, i.e. at or under about 500 feet per minute. Usually such belts are mostly vulcanized and therefor do not employ metal splicing devices.

Apparatus particularly successfully designed for this purpose include the belt scrapers shown in co-owned U.S. Pat. No. 4,202,394 issued Sep. 6, 1983 and U.S. Pat. No. 4,696,388 issued Sep. 29, 1989. The scraper blades, as shown in these patents, are reversible i.e., they can be rotated without the necessity of having to remove the scraper blade from its position underneath the belt, to extend the wear life by utilizing an opposite surface of the blade. Also, such blades are symmetrical in that they could be installed in either position, i.e., with either side becoming the leading edge or the trailing edge.

In the 1980's, dramatic changes began to take place in certain bulk conveyor requirements. An example is the introduction into the United States of European long wall coal mining technology. The long wall mining technology enabled U.S. coal mining companies to produce between three to ten times higher tonnage than was conventionally produced at these existing properties.

Dramatic changes in mining techniques required similarly dramatic changes in the belt conveyor systems which removed the material to the surface and beyond. Because of the speed of the mining technology, belt conveyors also increased in speed as well as length. The longer belts often required the employment of metal splices to connect the belt sections. Belt cleaning requirements became severe, with belt speeds of 700 to 900 ft. or more per minute not uncommon.

Increased belt cleaning blade pressures had to be employed, and new materials used to permit the blade to stand up under these conditions, and not be bent backward upon itself in the direction of belt travel. In order to meet the demands of high speeds the blade loading pressures have more than doubled.

Attempts to meet the increased demands on belt scrapers, for example, in the long wall coal industry, have included a consideration and use of urethanes of varying durometers as the scrapping blade wear surface. Some urethanes have proven to be successful when operated with a relatively sharp scrapping edge and at low pressures, in which the edge is positioned to skim or strip the material from the belt. Metal blades have been tried, but a slight misalignment of the blade can result in belt damage.

If urethane is used at high pressure, the heat build up at the interface between the urethane material and the belt, due to friction, can quickly bring the urethane material up to a glass transition temperature, at which point it looses its strength and wears rapidly.

For this reason, the applicant has preferred to employ relatively high pressure, absolutely flat cleaning contact as achieved by applicant's patented pneumatically pressured belt scrapers, exemplified by patent '394 in which a relatively impenetrable contact region is formed between the blade and the belt. This region allows only the belt to pass by, while the extraneous material is scrapped off. The scrapping is accomplished at the front edge or leading edge of the blade, and the remaining thickness provides the required stiffness, support, and wear resistance.

In order to meet the needs of the long wall coal industry, a belt scraper blade for a positive pressure blade support system was designed and placed in use which incorporated a rubber scraper blade made of black or filled molded rubber material of tire tread grade, backed by a semi-rigid cured resin impregnated fiber backing plate. The rubber scraper element, which formed the leading edge, had sufficient resilience and toughness when retained and supported by the fiber backing, so that the rubber scraper blade could be held at about 90° to the belt.

A resin impregnated fiber backing plate has less wear resistance than the rubber. Therefor, the fiber backing plate wears at a more rapid rate than the rubber scrapping element, and full contact pressures through the rubber is maintained.

A double sided blade has been made, as illustrated in FIGS. 1 and 2 and described in greater detail below, but this has required the removal and the end-to-end reorientation of the blade, to present the opposite working surface to the belt. For example, a 60 inch blade may weigh 75 pounds. Reversal requires the awkward handling of the blade from a position which may be below the belt, or an awkward position alongside the belt, and introduced an element of risk to the persons responsible for removing the blade, reversing its position, and reinstalling the same. The procedure is time consuming and at times it is both confusing and difficult, since scrapers are often in relatively inaccessible locations, with poor lighting, thereby at times making it possible for the scraper to be improperly oriented such that the fiber side is leading rather than trailing, or the blade may be accidentally dropped into a waste pit.

There is therefor a need for a high strength, fiber backed, high pressure scraper blade which is integrally formed in a single blade holder or frame, which provides the required wear resistance and strength, and which can be reversed, in set to and in place, simply by rotating the blade through 180° and reattaching the same to the blade support arms. Such a blade does not require personnel to reach extensively under or around a belt in order to present a renewal surface to the belt.

SUMMARY OF THE INVENTION

The reversible high pressure scraper blade of this invention provides an integral composite belt scrapping construction, with flat belt contacting surfaces, in a metal frame, in which the components are arranged such that the blade may be inverted by rotating about its center axis through 180° and reclamped or reconnected.

In one preferred embodiment, a pair of phenolic resin impregnated fiber backings are arranged in opposed and staggered relation to a single molded rubber scraping body and in association with a steel support frame, with portions of the fiber backings arranged in relatively overlapping relation with respect to each other and with respect to the frame, to form a symmetrical scraper blade which may be reversed in position by simple rotation. Preferably, the fiber backing plates are molded in place, one each in one of a pair of off-set face recesses formed in the molded rubber scrapping body. The flat transversely extending sections of the steel frame thus butt directly against an associated one of the fiber backing plates. The steel frame sections are joined to form a unitary assembly by a series of transversely positioned flat steel slugs which extend through openings formed in the respective fiber plates, and through the central web of the rubber scraper body. This forms an extremely strong I-beam like construction.

The preferred embodiment of the invention, as described in the preceding paragraph, may be applied to a belt scraper in which the transverse scraping region forms a generally straight line or a plane, or may be with advantage applied to a belt scraper which has a convexly shaped belt-engaging surface, as shown in Stoll, U.S. Pat. No. 4,696,388 issued Sep. 29, 1987. Such a convex belt scraper may be preferred to conform to the contour of the conveyor belt.

The reversible scraper of the invention is therefor a double fiber-backed scraper in which the fiber backings as well as the I-beam-like construction of the frame, contribute to strength. The fiber backings themselves may be provided with holes through which the blade rubber may flow during curing and setting, so that the fiber backings become a permanent and integral part of the scrapping element.

It is accordingly an important object of the invention to provide a high pressure reversible or flip over belt scraper for use with relatively high speed material conveyor belts, such a long coal conveyor belts employed to carry coal in long-wall mining operations, and the like.

Another object of the invention is to provide a symmetrical reversible belt scraper blade employing a pair of vertically off-set resin impregnated and cured fiber backing elements which respectively support an intermediate cured rubber belt scraper blade, in a steel frame, which therefor be reversed by simply rotating the belt scraper blade end frame within the support arms.

In a still further embodiment of the invention, the elastomer is provided with hard ceramic inserts forming a hard wear surfaces. Such ceramic surfaces may be preferred where exceptionally long life is required under difficult conditions, such as where the residue of the material being conveyed is highly abrasive. The inserts thus may be made of a high alumina content ceramic, such as the kind which has been successfully used for the lagging of pulleys.

These and other objects and advantages of the invention will be apparent from the following description, the accompanying drawings and the appended claims.

BRIEF DESCRIPTION OF THE DRAWINGS

FIG. 3 is a perspective view of a reversible belt scraper blade according to this invention;

DESCRIPTION OF THE PRIOR ART

Figure 1:
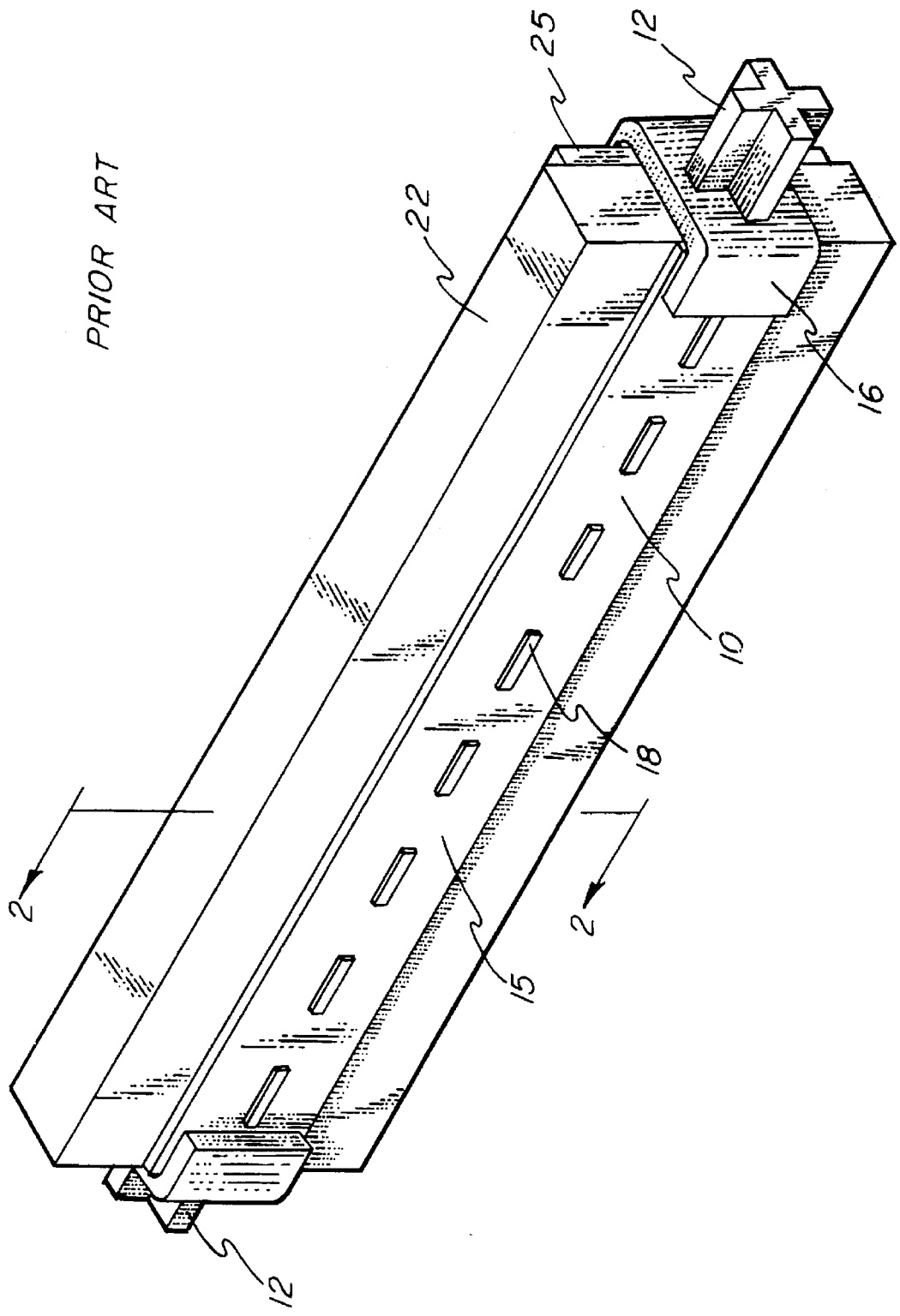
FIG. 1 is a perspective view of a prior art conveyor belt scraper blade.
Figure 2:
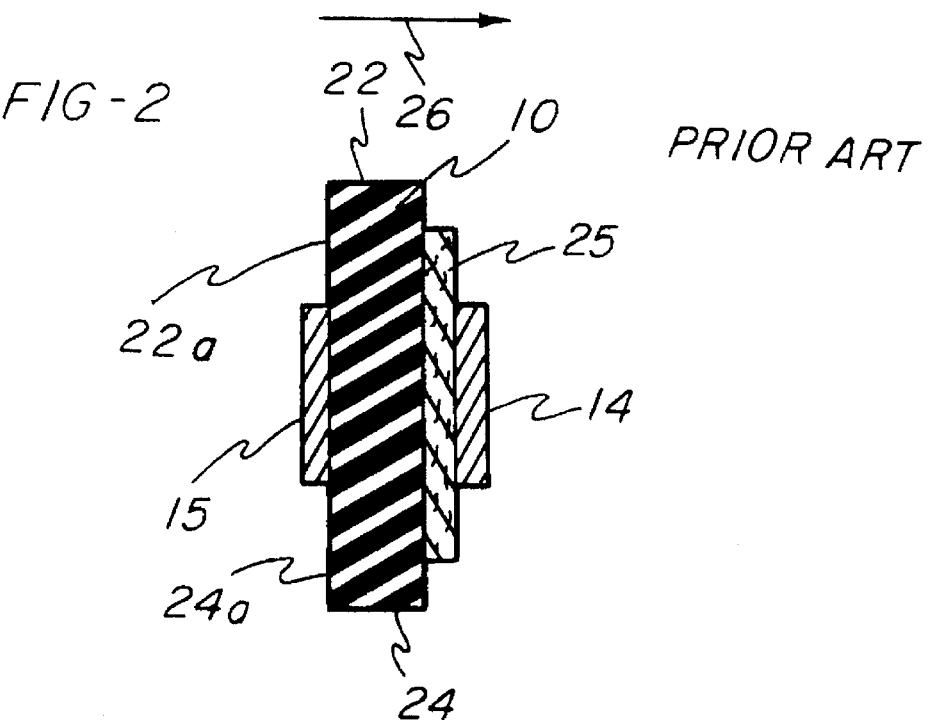
FIG. 2 is a sectional view through the blade of FIG. 1.

Referring to FIGS. 1 and 2, a blade holder frame 10 is provided with a pair of support ends 12, cruciform shaped in cross-section. The blade holder frame 10 comprises a pair of transversely extending steel side frames 14 and 15, FIG. 2, joined at the cruciform ends 12 and welded thereto at end flanges 16, forming a part of the supporting ends 12. The frames 14 and 15 are flat steel members in which connector means in the form of steel rectangular segments or slugs 18 extend through openings in the frames, with ends welded to the exterior of the respective frames. The slugs 18 pierce the material making up the belt scraper elements, and join the frames 14 and 15 together in spaced-apart relation.

The primary belt scraper element is a rectangular cured block 20 of tire grade rubber formed with opposite flat belt engaging ends 22 and 24 and leading face edges 22a and 24a in a common plane. It is supported and backed by a rigid phenolic resin impregnated fiber backing plate 25 which also extends the length of the rubber scraper block 20, and provides backing support for the working ends of the block 20.

The scraper blade 10 of FIGS. 1 and 2 may be operated in one direction only, that is, with the belt running in the direction of the arrow 26 in FIG. 2. When it is desired to reverse the blade, it is necessary to disassemble the same at the ends 12 from the support arms (not shown) and then the blade must be turned end-for-end and inverted to maintain the running relationship as identified by the arrow 26. As previously noted, this can become awkward and time consuming. Sometimes, the belt scrapers are located above catch-all pits, and if the belt scraper blade is mishandled, it may easily drop into the pit.

DESCRIPTION OF PREFERRED EMBODIMENTS

Figure 4:
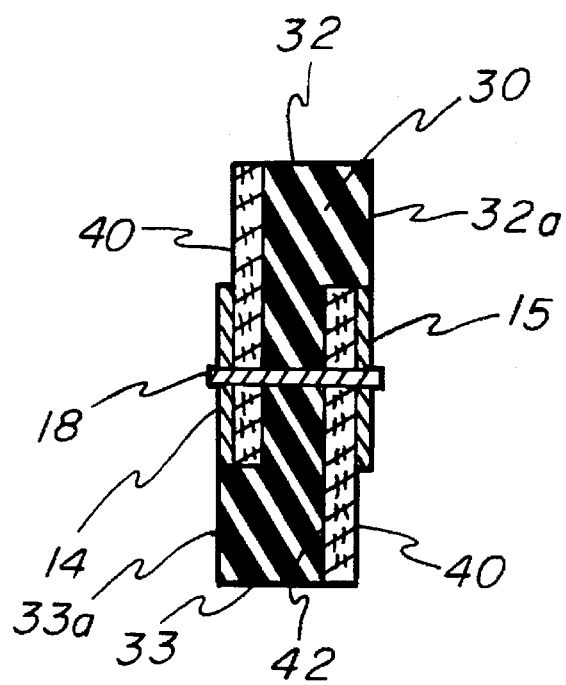
FIG. 4 is a sectional view through the blade of FIG. 3 taken along line 4—4 of FIG. 3.

A first preferred embodiment of the invention is illustrated in FIGS. 3 and 4, in which like parts have been numbered with like reference numerals. The scraper element consists of a molded block 30 of carbon filled black tire tread rubber formed with substantially opposite and relatively flat belt engaging scraper surfaces 32 and 33. The scraper is symmetrical in that the block 30 integrally supports and includes a pair of identical phenolic resin impregnated fiber backing plates 40 set or positioned in off-set recesses 42 formed in the opposite side faces of the block 30. The recesses are generally L-shaped in section each open at one of the surfaces 32 or 33 and extending longitudinally of the length of the block 30.

The fiber backing plates 40 are relatively rigid and are less resistant to wear than the material of the block 30, to assure full or flat block contact against the belt. The opposite edges of the plates 40 are coterminous with the respective scraper surfaces 32 and 33 and extend in the respective recess laterally or transversely the width of the blade and the width of the frames 14 or 15.

It will be seen that the recesses 42 are formed with a depth with substantially equals the thickness of the backing plate 40 plus the thickness of the frame member 14 or 15. Thus, the recess 42 may be considered as extending respectively from one of the working surfaces or faces 32, 33 parallel to a side wall and to a position which is somewhat beyond the center or median line of the block 30.

By providing a recess 42 for the backing plate 40 which is sufficiently deep to accommodate the frame 14 or 15, on the working side, the frame itself is covered by a portion of the block 30, at the leading side 32a or 33a, and is thus prevented from accidentally contacting the belt.

The sectional view of FIG. 4 shows the orientation of one of the steel slugs 18 extending between the frames, and through suitable aperture openings preformed in the fiber backing plates 40 and in the frames 14 and 15. It is not necessary to form an aperture within the block 30 since the slugs 18 may be suitably driven through this block from either one side or the other, with the frames in place, and then the ends of the slugs are welded at the frames to form a rigid assembly.

Preferably, the backing plates 40 are integrally bonded in place to the block 30 simultaneously with the molding and curing of the block 30. To facilitate the connection of the fiber backing plates to the block, suitable openings, not shown, may be formed in the fiber backing plates into which the elastomer material may flow during the molding and curing process. Even if the fiber backing plates are not themselves physically secured, in the sandwich construction the plates are clamped between the opposed steel frames 14 and 15 and provide strength to the elastomer block 30, to support the same in its upright and flat engagement with the belt along the surface 32 or 33 without any substantial fold back of the material. The blade also has superior strength compared to the prior art blade described in connection with FIGS. 1 and 2, by reason of the fact that the pair of vertically off-set fiber backing plates 40 contribute to the overall strength of the blade.

When one of the working surfaces 32 or 33 has become worn, and before it wears down to the frame, the life of the blade may be restored simply by loosening the scraper support arms (not shown) at the cruciform ends 12 and rotating the blade about its longitudinal axis through 180°, while maintaining its relative position, and then reassembling the same on the arms.

In a given example, the elastomeric material making up the rubber body or block 30 may have a hardness of 60 durometer to provide sufficient wear resistance and yet toughness, employing tire grade rubber material.

While the invention has been described in terms of a molded rubber body 10, it should be understood that it is within the scope of this invention to fabricate the body 30 from a previously prepared sheet rubber material. Also, as previously noted, while the embodiment is shown as having a transversely flat surface, it is within the scope of this invention to provide the rubber body as well as the attendant backing plate, with a continuous belt scraping surface which is formed with a convex shape with respect to a central longitudinal axis such that this surface is at a greater distance from the axis at the mid-portion of the blade than at the ends of the blade. Such a contoured belt scraping surface is found to have particular advantage as conforming the concave contour of a used conveyor belt.

The composite fiber backing plate has the function of supporting and holding the rubber block from laying over, while the belt is being cleaned but does not perform a cleaning function. The phenylic resin impregnated fiber backing plates may have a thickness of about ½ of an inch to provide sufficient rigidity and strength. Good results have been achieved with face surfaces 32 and 33 of approximately 2 inches in width.

When one of the faces is worn down to within an ¼ to ⅛ of an inch of the frame members, it must be turned over to expose the opposite surface. It has been found that if the fiber backing should become the leading surface, the blade scraps very poorly. Thus, the leading edge as shown at 32a and at 33a, must be the elastomer edges. Sufficient pressure is exerted by pneumatic loading cylinders supporting the blade support arms, as shown in previously mentioned U.S. Pat. No. 4,202,394 such that full contact along the surface 32 or 33 is maintained with the belt. This surface may be transversely flat, or may be formed with a convex shape as disclosed and described in U.S. Pat. No. 4,696,388. In either case, the purpose is to create an impenetrable contact between the rubber block 30 and the adjacent surface of the belt, which allows the belt only to pass, and the extraneous material to be scrapped off its surface. It has been found that primarily the front leading edge 32a or 33a of the block 30 actually does the scrapping, while the remaining thickness, in the direction of belt travel, provides support and wear resistance.

Figures 5, 6:
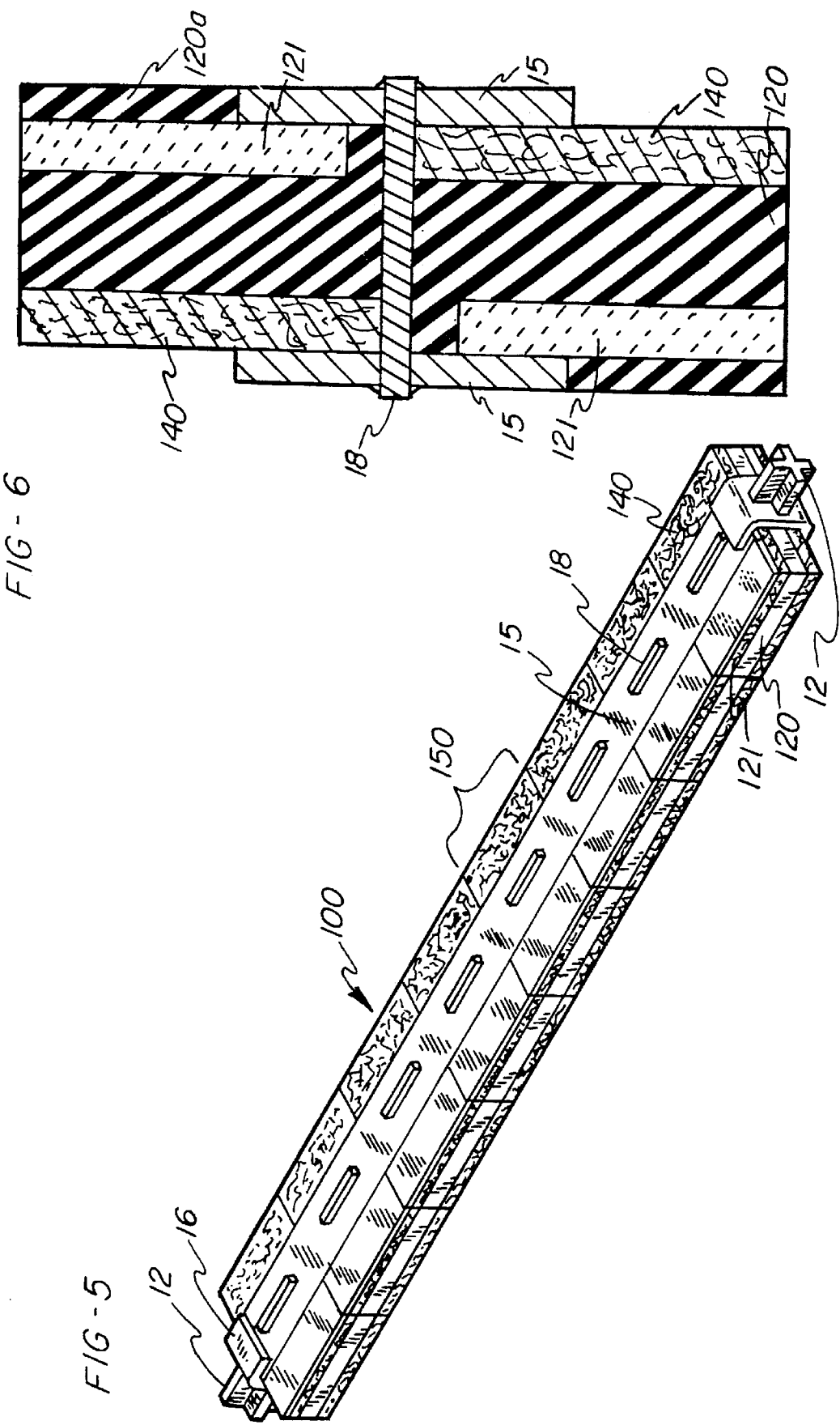
FIG. 5 is a perspective view of a modified form of the invention.
FIG. 6 is a sectional view through the blade of FIG. 5.

The embodiment as shown in FIGS. 5 and 6 represents a reversible scraper blade in which long-wearing ceramic bricks are inserted and molded within the rubber supporting block, and thereby form the primary scraping surface. The use of a high grade impact resistant alumina ceramic as the primary scraping and wearing surface can provide, in many instances, an extended blade life.

The scraper blade 100 of FIGS. 5 and 6 utilizes the same frame members which have been described in connection with the blade of FIGS. 3 and 4, including the side frames 15 and 16, the slugs 18, and the forked or flanged support ends 12.

The cured rubber block 120 is formed of the same material as the block 20 and supports, at diametrically opposite sides, pairs of individual ceramic bricks 121. The bricks 121 are embedded in the block 120 and are separated or spaced from the leading edge by a web or wall 120a of the block 120 which is bonded to the brick 121. This wall provides both mechanical support and impact protection for the ceramic brick 121.

The ceramic brick should be formed of an impact resistant high quality alumina ceramic similar to pulley lagging ceramic blocks, such as described in Shuginaka, U.S. Pat. No. 4,290,761 issued Sep. 22, 1981 or in Australia Patent AU-B-16370/88 published May 11, 1989.

The ceramic insert scraper blade 110 also differs from the blade 10, previously described, in that the ceramic bricks as well as the supporting rubber, and the fiber backing plates 140 are formed in modular segments 150 as shown in FIG. 5. The modular segments 150 are stacked end-to-end in alignment across the width of the blade, between the side frame members 14 and 15. The employment of a plurality of identical segments 150, each self-contained and each representing a portion of the transverse width of the blade, provides limited transverse flexibility without danger of fracturing the ceramic bricks 120. Preferably, one of the connector slugs 18 is used for each of the segments 150, holding these sections firmly in position and in relative alignment to each other.

When the segments 150 are stacked end-to-end as shown in FIG. 5, the bricks form a continuous scraping surface across the belt. In all other respects, the blade 150 is used in the same manner as has previously described in connection with the embodiment of FIGS. 3 and 4.

While the forms of apparatus herein described constitute preferred embodiments of this invention, it is to be understood that the invention is not limited to these precise forms of apparatus, and that changes may be made therein without departing from the scope of the invention.

What is claimed is:

1. A two-sided longitudinally extending belt scraper blade for a conveyor belt scraper which blade is reversible by rotating the blade about its longitudinal axis, particularly adapted for the cleaning of high speed bulk material conveyor belts when positioned in underlying relation adjacent to a surface of a belt to be scraped and extending in a longitudinal direction which is transverse to the direction of belt movement, comprising a body in the form of an elongated rubber block having a first transversely extending belt scraper surface on an upper side of said body and a second transversely extending reserve belt scraper surface on an opposite lower side of said body, said body having a pair of spaced generally parallel side walls extending between said surfaces, said body at each side wall having a longitudinally extending recess formed therein, each of said recesses being generally rectangular in shape and each said recess opening into one of said belt scraper surfaces, a pair of fiberboard backing plates, one each received in each of said recesses, each of said fiberboard backing plates having an outer edge positioned substantially in co-terminus relation with the associated said belt scraper surface, a pair of flat spaced-apart metal frames, one for each of said side walls, extending along said side walls in abutting relation to an associated one of said backing plates, connector means extending transversely of said blade through said body and said backing plates and having opposite ends joined at said metal frames, and support ends connected to longitudinal ends of said metal frames by which said blade may be mounted on a belt scraper in scraping relation to the belt.

2. The conveyor belt scraper blade of claim 1 further comprising ceramic bricks embedded in said rubber block, each said ceramic brick having a wear surface exposed at and forming a part of one of said scraper surfaces.

3. A two-sided longitudinally extending belt scraper blade for a conveyor belt scraper which blade is reversible by rotating the blade about its longitudinal axis comprising:

a longitudinally extending body formed of a block of rubber, said body having a transversely extending flat scraper surface on one side thereof and a second transversely extending flat scraper surface on an opposite side thereof and having spaced generally parallel side walls extending between said surfaces, each said side wall being formed with a transversely extending generally L-shaped recess, each said recess extending from one of said scraper surfaces to a position on said body beyond the median line thereof and each opening at one of said scraper surfaces, a pair of fiber resin-impregnated backing plates, one received in each of said recesses, each of said backing plates having a thickness less than the transverse depth of the associated said recess having an outer edge substantially co-planar with an associated said scraper surface, and having a longitudinal length substantially the same as said body, a pair of flat, spaced-apart metal frame members, one extending along each of said side walls in said recesses and in abutting relation with the associated said backing plate, each said frame member having an outer surface substantially in alignment with one of said body side walls, a plurality of longitudinally spaced individual slugs extending transversely through said plates and said body and having ends welded to said frame members to form an I-beam like assembly, and blade mounting means positioned on said frame members at each longitudinal end thereof for supporting said blade on a belt scraper with one of said scraper surfaces in running engagement with a conveyor belt.

4. The belt scraper blade of claim 3 in which said flat scraper surfaces are about 2.0 inches in width and in which said fiber backing plates are about 0.5 inch in width.

5. The belt scraper blade of claim 3 in which said fiber backing plates are bonded to said body at said recesses.

6. The belt scraper blade of claim 3 in which said slugs comprise rectangular segments of metal which extend through said body and through openings formed in said backing plates and in said frame members and having ends exposed at an outer surface of frame member exposed surfaces and welded thereto.

7. A longitudinally extending conveyor belt scraper blade for a conveyor belt scraper which blade is reversible by rotating the blade about its longitudinal axis comprising:

a pair of longitudinally extending spaced apart support frames, a plurality of modular scraper segments positioned in end-to-end longitudinal alignment in a space between said frames, each said scraper segment including a block of elastomer material, said block having first and second flat scraper surfaces extending respectively above and below said frame members, each said block having a pair of relatively rigid backing plates one on each opposed lateral side thereof, each of said blocks having embedded therein a pair of ceramic bricks, one for each of said scraper surfaces, with a surface portion of each said brick being exposed at one of said scraper surface and fasteners extending between said support frames and engaging said segments and side frames for retaining said segments in said space between said frames.

8. The scraper blade of claim 7 in which each of said rigid backing plates is formed of phenolic resin impregnated fiber and each has a wear surface in coplanar relation with one of the said brick surface portions.

9. A belt scraper blade according to claim 7 in which each said block is formed with face surfaces coterminous respectively with one of said first and second face scraper surfaces, and in which said face surfaces form an impact barrier to one of said pair of ceramic bricks.

10. A longitudinally extending conveyor belt scraper blade for attachment to a belt scraper for cleaning a surface of a bulk material conveyor belt and which is reversible by rotating the blade about its longitudinal axis, comprising:

a pair of substantially identical, longitudinally extending spaced apart metal plate-like side frames, said side frames having length sufficient to extend across a width of a belt to be scraped, a scraper body formed as a block of rubber having lateral sides fitted in the space between said side frames, said body having a height proportioned to extend above and below said side frames and terminating in generally flat upper and lower belt scraper surfaces, said upper surface being above said side frames and said lower surface being below said side frames, a pair of substantially identical resin-impregnated fiber backing plates having heights less that the said height of said body, one each of said backing plates positioned between one of said body lateral sides and the adjacent said side frame with an exposed surface thereof in co-terminus relation with one of said scraper surfaces, for supporting a portion of said body which extends above said side frames against deflection when in scraping contact with the conveyor belt, means at the transverse ends of said side frames for supporting said blade on the belt scraper, and connector means extending between said side frames and through said body and joined to said side frames for securing said side frames in said spaced relation and retaining said body in position between said side frames.

11. A longitudinally extending conveyor belt scraper blade for attachment to a belt scraper for cleaning the surface of a bulk material conveyor belt, said scraper blade being symmetrical and reversible by rotating the blade about its longitudinal axis, comprising a pair of spaced apart metal side frames, said side frames having a length sufficient to extend across a width of a belt to be scraped, a scraper body formed as a block of elastomer material having lateral sides fitted in a space between said side frames, said body having a height proportioned to extend above and below said side frames and terminated in generally flat upper and lower belt scraping surfaces, said upper surface being above said side frames and said lower surface being below said side frames, a pair of substantially identical relatively rigid backing plates having a wear characteristic which exceeds that of said scraper body, one each of said backing plates positioned between one of said body lateral sides and the adjacent said side frame with an exposed surface thereof in co-terminus relation with one of said scraper surfaces of said body, for supporting a portion of said body which extends above said side frames against deflection when in scraping context with the conveyor belt, means at transverse ends of said side frames for supporting said blade on the belt scraper, and connector means extending between said side frames and through said body joining said side frames to each other and securing said side frames in spaced relation and retaining said body between said side frames.

* * * * *